(12) United States Patent
Beutler et al.

(10) Patent No.: US 6,842,667 B2
(45) Date of Patent: Jan. 11, 2005

(54) POSITIVE STATION MODULE LOCKING MECHANISM FOR EXPANDABLE IRRIGATION CONTROLLER

(75) Inventors: Matthew G. Beutler, Temecula, CA (US); Ronald H. Anuskiewicz, San Diego, CA (US); James F. McKnight, San Diego, CA (US); Santo Uccello, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 10/430,929

(22) Filed: May 5, 2003

(65) Prior Publication Data

US 2004/0225411 A1 Nov. 11, 2004

(51) Int. Cl.[7] .............................................. G06F 19/00
(52) U.S. Cl. .................... 700/284; 239/69; 137/624.11; 174/53; 174/50
(58) Field of Search .......................... 700/284; 239/69; 137/624.11; 361/331; 174/53, 50

(56) References Cited

U.S. PATENT DOCUMENTS

| | | | |
|---|---|---|---|
| 3,656,789 A | * 4/1972 | Ray ............................ 292/304 |
| 4,003,047 A | * 1/1977 | Johnson ...................... 340/542 |
| 4,018,100 A | * 4/1977 | Moe ....................... 74/483 PB |
| 4,176,395 A | * 11/1979 | Evelyn-Veere et al. ...... 700/284 |
| 5,025,361 A | * 6/1991 | Pitman et al. ................. 700/14 |
| 5,262,936 A | 11/1993 | Faris et al. .................. 364/140 |
| 5,602,728 A | * 2/1997 | Madden et al. ............... 700/16 |
| 5,735,487 A | * 4/1998 | Abild et al. ............. 244/129.5 |
| 5,748,466 A | * 5/1998 | McGivern et al. ............ 700/17 |
| 5,921,280 A | 7/1999 | Ericksen et al. ........ 137/624.11 |
| 5,956,248 A | * 9/1999 | Williams et al. .............. 700/16 |
| 6,062,889 A | * 5/2000 | Hyland et al. ............... 439/326 |
| 6,450,727 B2 | * 9/2002 | Lu ........................... 403/322.1 |
| 6,459,959 B1 | 10/2002 | Williams et al. ............. 700/284 |
| 6,705,882 B2 | * 3/2004 | Casses ....................... 439/157 |
| 6,721,630 B1 | * 4/2004 | Woytowitz .................. 700/284 |
| 2002/0002425 A1 | * 1/2002 | Dossey et al. .............. 700/284 |

OTHER PUBLICATIONS

MOTOROLA IRRInet Product Specification Sheets (3pgs), dated Feb. 16, 1993.
MOTOROLA IRRInet Irrigation Controller Color Photographs (5) dated May 2004.
Exhibit A, digital photograph of ICC™ controller station module with spring members.
Exhibit B, digital photograph of PRO–C™ station module mounting.

\* cited by examiner

*Primary Examiner*—Leo Picard
*Assistant Examiner*—Michael D. Masinick
(74) *Attorney, Agent, or Firm*—Michael H. Jester

(57) ABSTRACT

A modular expandable irrigation controller has controls for manual entry or selection of a watering program and a memory for storing the watering program. A processor executes the stored watering program and controls one or more station modules each including a station module circuit for energizing at least one solenoid actuated valve in accordance with the watering program. The irrigation controller has a plurality of receptacles for each removably receiving a station module and for providing an operative connection to the processor. A manually movable locking member is grasped and moved between UNLOCKED and LOCKED positions to positively secure each station module in a corresponding receptacle.

17 Claims, 7 Drawing Sheets

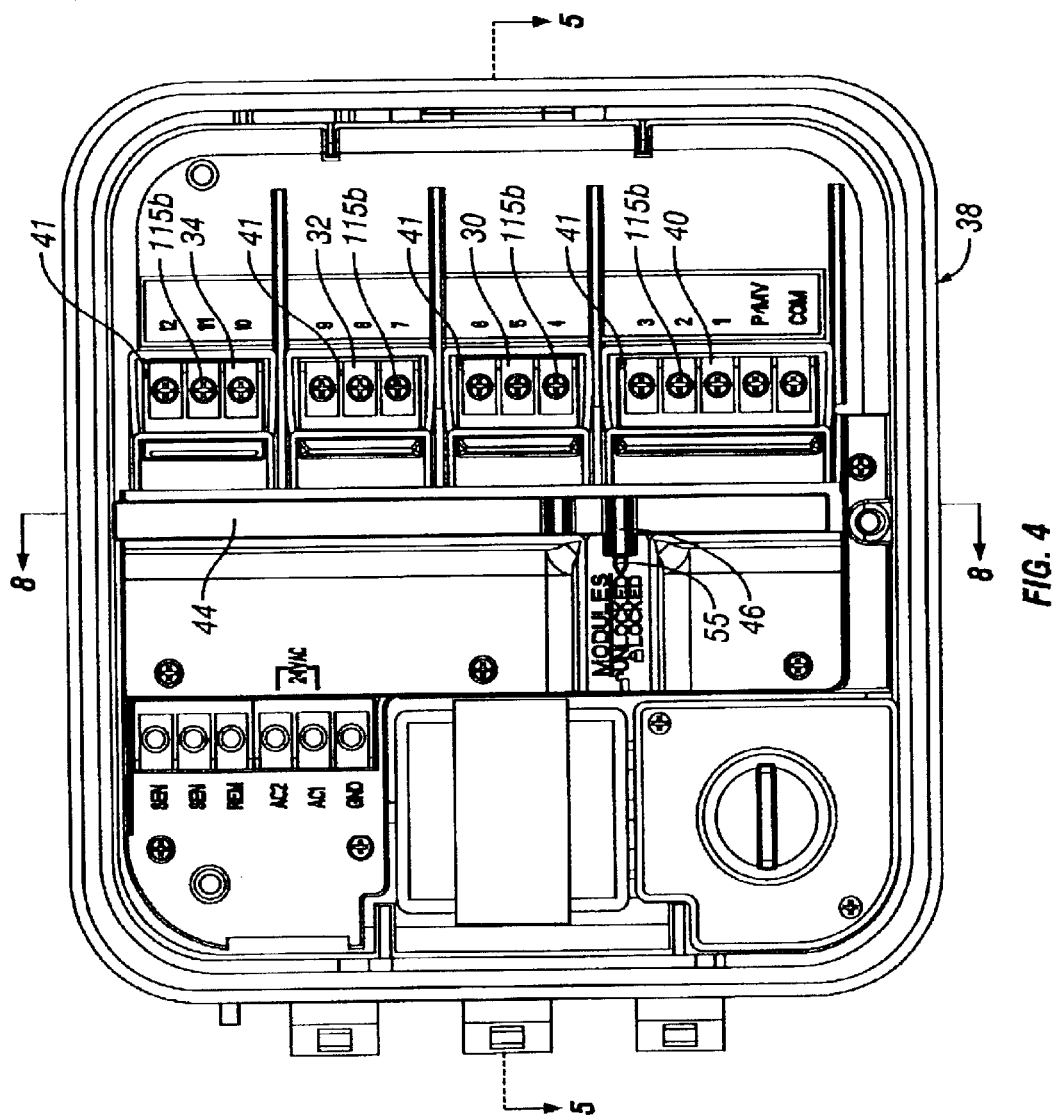

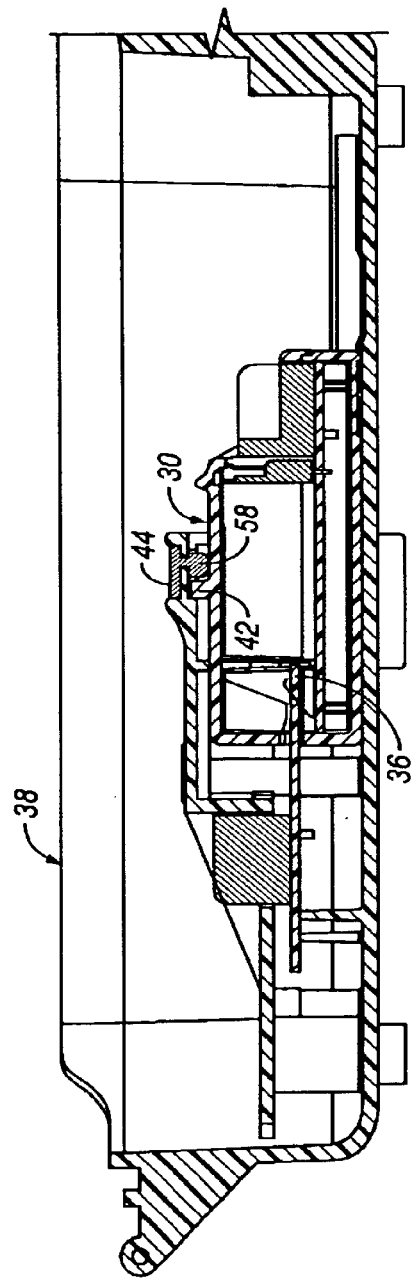
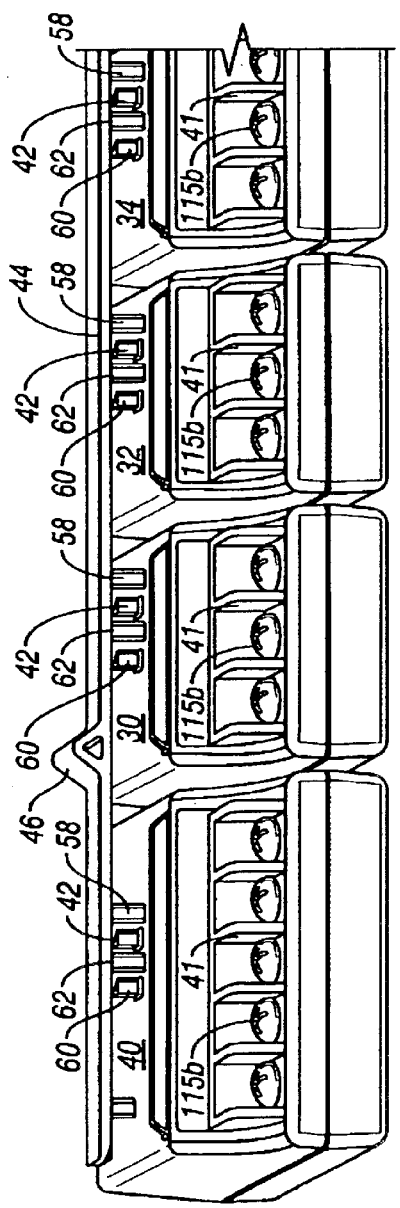
FIG. 5
FIG. 6

POSITIVE STATION MODULE LOCKING MECHANISM FOR EXPANDABLE IRRIGATION CONTROLLER

FIELD OF THE INVENTION

The present invention relates to electronic irrigation controllers that control valves which supply water to sprinklers, and more particularly, to modular expandable irrigation controllers.

BACKGROUND OF THE INVENTION

In many parts of the world due to inadequate rainfall it is necessary at some times during the year to artificially water turf and landscaping. An ideal irrigation system for turf and landscaping should utilize a minimum number of valves, supply lines and sprinklers. Preferably the valves should be turned ON and OFF by an inexpensive, yet reliable electronic irrigation controller that is easy to program and can carry out a wide variety of watering schedules. The goal is to uniformly distribute the optimum amount of water over a given area. Rotor type sprinklers have largely displaced older impact type sprinklers in applications where large expanses of grass are watered, such as golf courses, due to the fact that the former are more reliable, quieter, and distribute water on a uniform and controlled basis. Spray type sprinklers, rotary stream sprinklers, bubblers and drip irrigation devices are also frequently used in residential and commercial irrigation systems. When an irrigation system is designed and/or installed the type, placement and precipitation rates for each of the sprinklers are pre-selected. The optimum precipitation rate provided by each sprinkler should preferably fall within plus or minus one-quarter gallons-per minute (GPM). The amount of water supplied by each sprinkler is largely determined by the size and configuration of its nozzle orifice(s), although variations result from fluctuations in water pressure that cannot be fully negated with regulators.

Preferably an irrigation controller should have the capability of temporarily terminating its watering program if sufficient rain occurs based on signals inputted from a rain sensor. See for example U.S. Pat. No. 5,097,861 granted Mar. 24, 1992 of Hopkins et al. entitled IRRIGATION METHOD AND CONTROL SYSTEM, assigned to Hunter Industries, Inc., the assignee of the subject application, the entire disclosure of which is hereby incorporated by reference. On suitable rain sensor for this purpose is disclosed in pending U.S. patent application Ser. No. 10/053,100 filed Oct. 26, 2001 of Paul A. Klinefelter et al. entitled QUICK SHUT-OFF EXTENDED RANGE HYGROSCOPIC RAIN SENSOR FOR IRRIGATION SYSTEMS, now U.S. Pat. No. 6,570,109 granted May 27, 2003, also assigned to Hunter Industries, Inc., the entire disclosure of which is hereby incorporated by reference.

Residential and commercial irrigation systems typically include one or more solenoid operated valves that are turned ON and OFF by an electronic irrigation controller. The valves admit water to various subterranean branch lines usually made of PVC pipe that typically have several sprinklers connected to risers coupled to the branch-lines at spaced intervals. Each combination of a solenoid valve and its associated sprinklers is referred to in the irrigation industry as a station or zone. A modern electronic irrigation controller typically includes a microprocessor and separate memory, or a micro-computer with on-chip memory, that stores and executes one or more watering programs. The watering programs can be pre-programmed by the user via push button and/or rotary controls. The controller usually has an LCD or other display to facilitate programming by the user. Often the controller will revert to a default watering program in the case of a power failure. The microprocessor controls the solenoid valves via suitable drivers and switching devices. The valves are opened and closed by the microprocessor in accordance with the pre-programmed run and cycle times for each of the stations.

Over the past decade, modular expandable irrigation controllers have gained increasing popularity. In these controllers, the base portion of the system contains the microprocessor and user actuated controls. Each station is then controlled by a corresponding station module which comprises a plastic housing that encloses and supports a station module circuit, as well as wire connection terminals for connecting wires to a plurality of solenoid actuated valves. Typically each station module can independently control more than one solenoid actuated valve, i.e., station. The station modules contain pins, sockets, card edge connectors or some other standard form of electro-mechanical connectors for allowing them to be inserted into slots or receptacles in either the housing that contains the microprocessor or a separate back panel hinged to the microprocessor housing. The advantage of this configuration is that the controller need only be equipped with the minimum number of station modules that can control the total number of stations. Thus, for example, an irrigation system may have only three zones, requiring only a single station module, while another may have twelve stations which might require four station modules. Considerable cost savings are thus achieved. Moreover, if an irrigation system expands after initial installation because the landscaping has increased, additional station modules can be added. In some modular expandable irrigation systems the base unit is capable of controlling a minimal number of stations without requiring the addition of any station modules. In others, such as the ICC™ and Pro C™ irrigation controllers manufactured and sold by Hunter Industries, Inc., at least a power module and one irrigation station module must be plugged into the controller in order to operate any stations or zones.

When the station modules are plugged into the receptacles of a modular expandable irrigation controller they are mechanically supported and an electrical connection is made between the microprocessor and the driver. The station modules can be removed and replaced if damaged, for example, during a lightening strike. It has been conventional to use plastic spring members or elements to hold the station modules in place in their respective receptacles or slots. However, such springs often require considerable force to be exerted by the user, both during installation and withdrawal of the station modules. The spring members can also break and difficulties have been encountered in ensuring that a complete and positive electrical connection is both achieved and maintained. In some cases, station module installation can lead to breakage in the metal pins or metal leaf spring contacts used to make the electrical connection.

Accordingly, it would be desirable to provide a modular expandable irrigation controller with improved station module mating to minimize or eliminate the foregoing problems.

SUMMARY OF THE INVENTION

In accordance with the present invention a modular expandable irrigation controller has controls for manual entry or selection of a watering program and a memory for storing the watering program. A processor executes the stored watering program and controls one or more station modules each including a station module circuit for energizing at least one solenoid actuated valve in accordance with the watering program. The irrigation controller has a plurality of receptacles for each removably receiving a station module and for providing an operative connection to the processor. A manually movable locking member secures each station module in a corresponding receptacle.

BRIEF DESCRIPTION OF THE DRAWINGS

FIG. 4 is a top plan view of a second embodiment of the present invention.

FIG. 5 is a vertical sectional view taken along line 5—5 of FIG. 4.

FIG. 6 is an enlarged fragmentary perspective view illustrating the relationship of the locking slide bar of the second embodiment to four modules installed side-by-side in its bay when the locking slide bar is in its UNLOCKED position.

DESCRIPTION OF THE PREFERRED EMBODIMENTS

Figure 1:
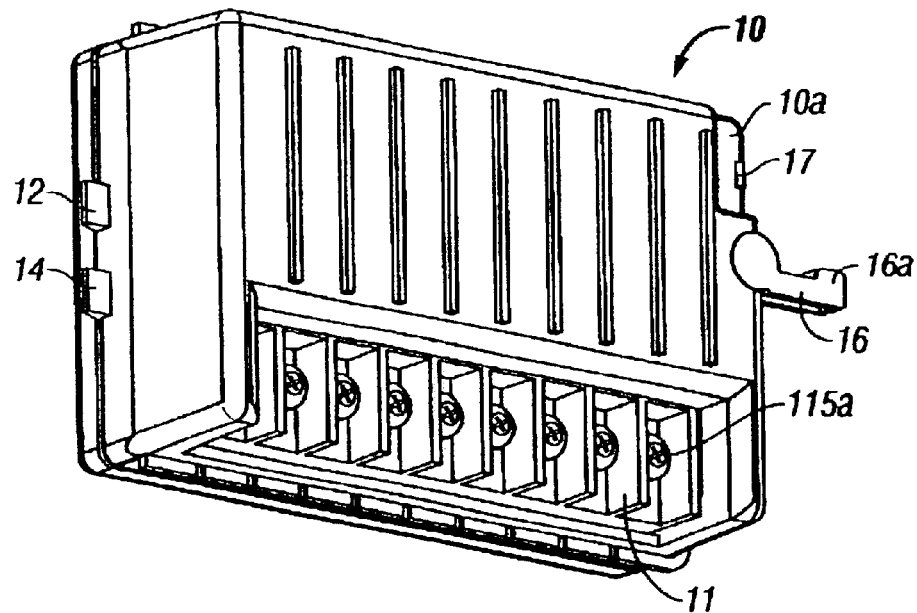
FIG. 1 is an enlarged perspective view of a station module of a first embodiment of our invention.
Figure 2:
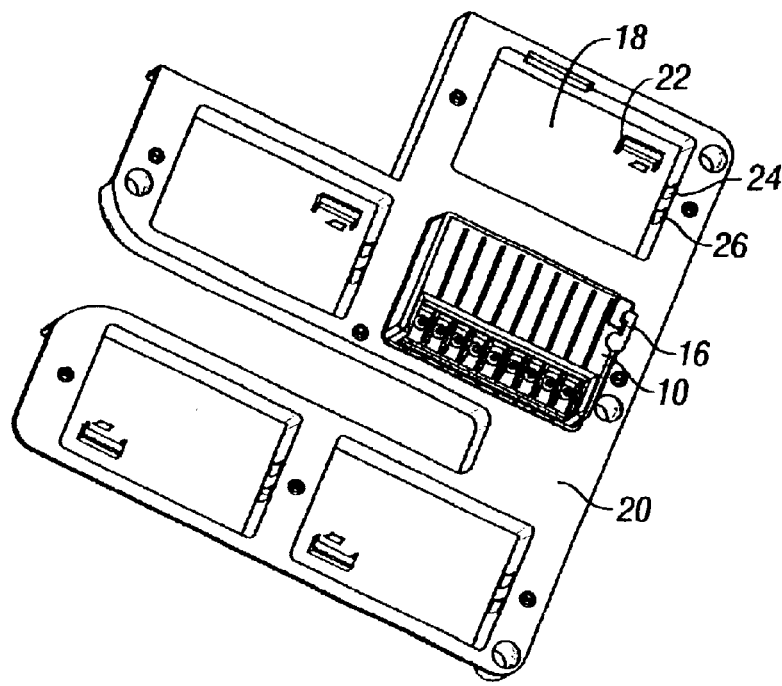
FIG. 2 is a fragmentary perspective view of the station module of FIG. 1 inserted into a back panel of the first embodiment.
Figure 3:
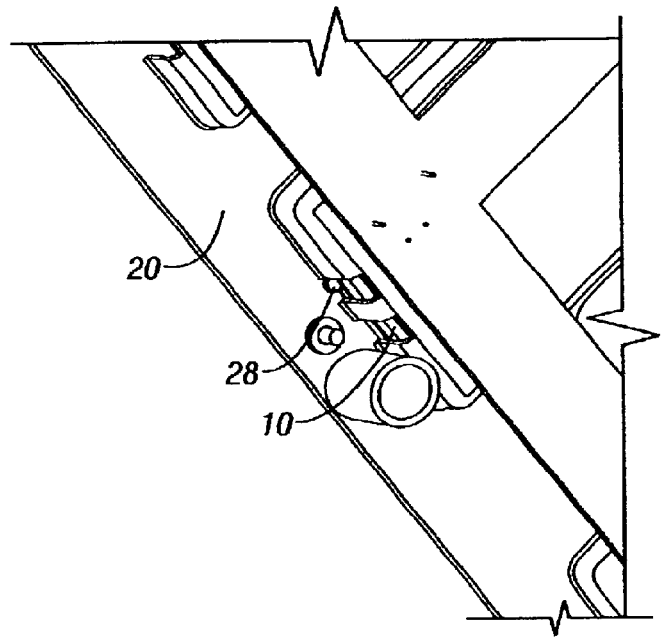
FIG. 3 is an enlarged fragmentary perspective of the rear side of the back panel illustrating the engagement of locking tab of the first embodiment with the back panel.

Referring to FIGS. 1–3, in accordance with a first embodiment of our invention, a rectangular station module 10 has a pair of rigid (non-resilient) wedge-shaped tabs 12 and 14 that project from one end and a pivotable locking lever 16 that is mounted at the opposite end. The station module 10 is inserted into a receptacle such as 18 (FIG. 2) formed in the back panel 20 that is hinged to a separate housing (not shown) that contains the microprocessor. During the insertion of the station module 10 into the receptacle 18, the left end of the station module is first lowered into the receptacle 18 so that the wedge-shaped tabs 12 and 14 are inserted into corresponding side-by-side rectangular apertures in one end wall of the receptacle 18, which are similar to the two apertures 24 and 26 in the opposite end wall. The right end of the station module 10 is then lowered into the receptacle 18. At this time pins (not shown) on the back side of the station module 10 are plugged into corresponding holes in a female electrical connector 22 to establish connection with a serial bus.

Once the station module 10 has been fully inserted into the receptacle 18, the locking lever 16 is swung or pivoted ninety degrees from its extended (unlocked) position illustrated in FIG. 1 to its retracted (locked) position illustrated in FIG. 2. This motion is translated via a drive shaft (not illustrated) journaled in a bearing sleeve in the end wall of the station module 10 to move a planar locking tab 28 (FIG. 3) underneath the back panel 20. The various parts are dimensioned to provide a snug or tight fit when the locking lever 16 is moved to its locked position. Thus, the station module 10 is locked and held in place within the receptacle 18 via the wedge-shaped tabs 12 and 14 and the planar locking tab 28. The station module 10 can be removed from the receptacle 18 by swinging the locking lever 16 to its unlocked position and first lifting the right end of the station module to unplug its pins from the connector 22 and then lifting the left end of the station module to remove the wedge-shaped tabs 12 and 14 from their corresponding apertures in the left end wall of the receptacle 18. An important aspect of the controller illustrated in FIGS. 1–3 is that the station module 10 will fit in the receptacles of an older design. In other words, the station module 10 is backward compatible with an original commercial design of the controller.

Figure 7:
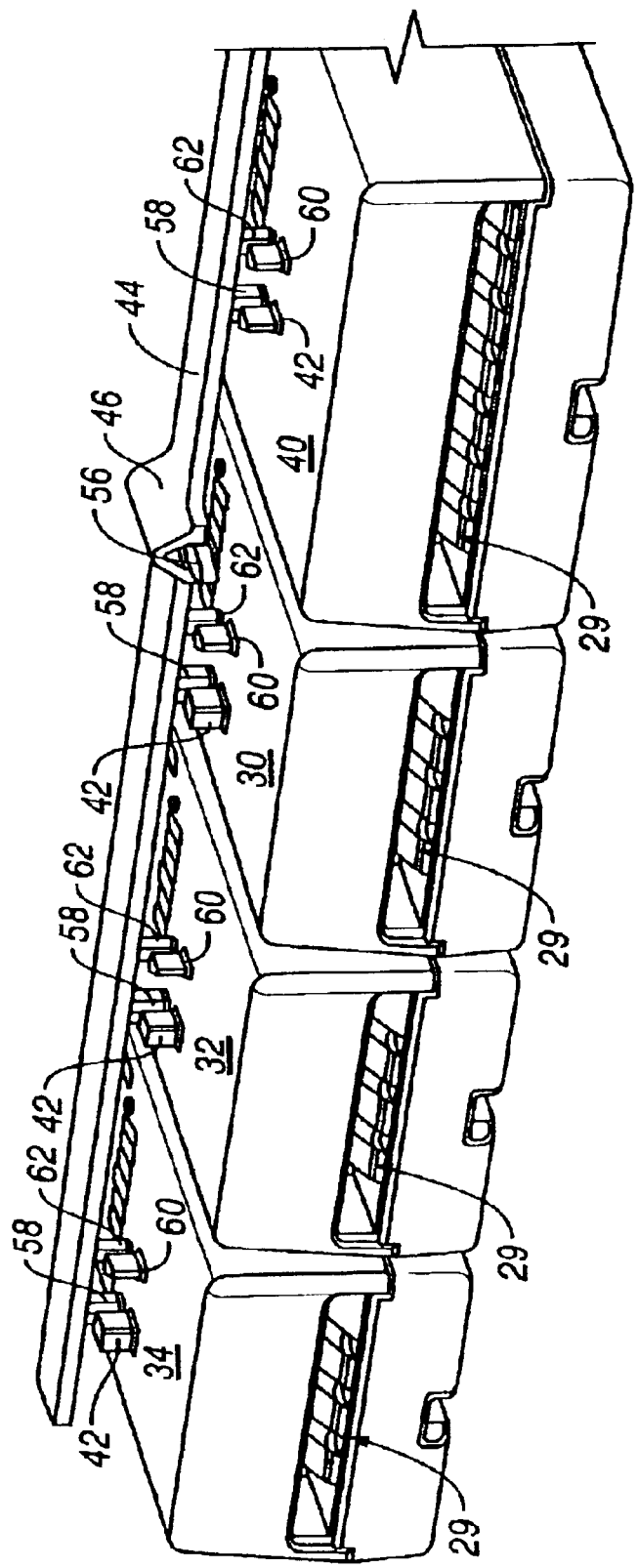
FIG. 7 is an enlarged fragmentary perspective view similar to FIG. 6 but taken from a different angle and illustrating the relationship of the locking slide bar of the second embodiment to four modules installed side-by-side in its bay when the locking slide bar is in its LOCKED position.
Figure 8:
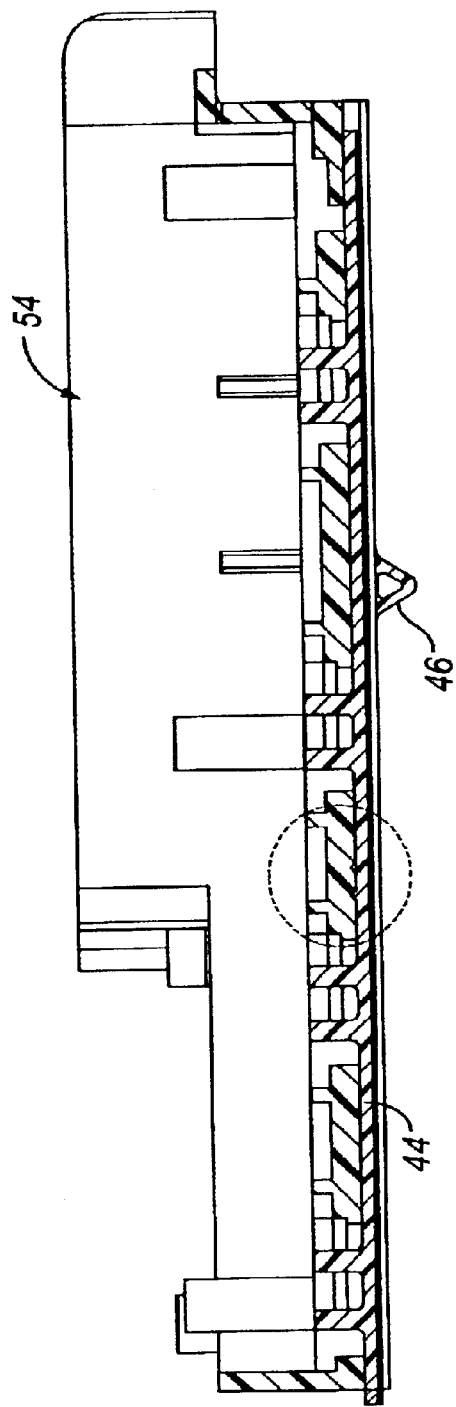
FIG. 8 is an enlarged vertical sectional view of the locking slide bar taken along line 8—8 of FIG. 5.
Figure 9:
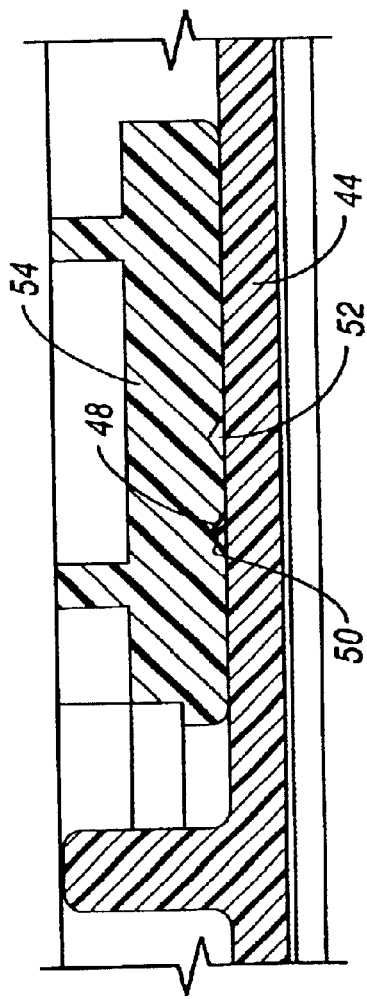
FIG. 9 is a greatly enlarged fragmentary view of the portion of the locking slide bar circled in FIG. 8.

A second embodiment of our invention is illustrated in FIGS. 4–9. Referring to FIG. 7, female electrical connectors 29 in the ends of three box-like station modules 30, 32 and 34 receive corresponding card edge connectors such as 36 (FIG. 5) with mating electrical contacts. The station modules 30, 32 and 34 are received in side-by-side fashion in a bay formed in a rectangular back panel 38 (FIG. 4) that is separate from the housing (not illustrated) that encloses the microprocessor. A larger, fourth box-like power module 40 (FIG. 6) plugs into the bay onto its own card edge connector and drives the pump master valve and the first three station modules 30, 32 and 34. The upper sides of the modules 30, 32, 34 and 40 each have an upstanding projection 42 (FIG. 6). A locking slide bar 44 (FIG. 8) with a V-shaped gripping member 46 extends above the bay and may be slid laterally (left and right) between an unlocked position illustrated in FIG. 6 and a locked position illustrated in FIG. 7. A V-shaped bump 48 (FIG. 9) on the underside of the locking slide bar 44 can alternately register with different V-shaped detents 50 and 52 formed in a cover 54 to hold the locking slide bar 44 in its locked and unlocked positions. A pointed tab 55 (FIG. 4) extending from the gripping member 46 alternately points to UNLOCKED and LOCKED indicia molded into the adjacent back panel structure to indicate the module connection status to the user.

When the locking slide bar 44 is moved downwardly in FIG. 4 to its locked position, downwardly extending locking elements 58 (FIG. 5) move behind the upstanding projection 42 on each of the modules 30, 32, 34 and 40 to mechanically lock the modules in the bay and prevent their withdrawal. Any or all of the modules can be removed from the bay by moving the locking slide bar 44 upwardly in FIG. 4 to its unlocked position so that the locking elements 58 are cleared from behind the projections 42 to permit the modules to be pulled off of their corresponding card edge connectors. The new modules 30, 32, 34 and 40 of the controller of FIGS. 4–9 are backward compatible with an earlier original design of the controller because they simply plug into the card edge connectors which hold them in place. The old modules of the original controller are also forward compatible with the re-designed controller. FIGS. 6 and 7 also illustrate the upstanding projection 60 of the old modules which is spaced laterally with respect to the upstanding projection 42 of the newer modules. The locking slide bar 44 has alternate downwardly extending locking elements 62 (that are laterally displaced from the locking elements 58) and move behind the upstanding projections 60 of the older modules to lock them in place. The old modules only have the upstanding projection 60 and the new modules only have the upstanding projection 42, but both are shown in FIGS. 6 and 7 at the same time in order to illustrate the backward and forward compatibility.

Referring to FIG. 6, the upstanding projections 42 and 60 have a triangular cross-section, the downwardly extending locking elements 58 and 62 have a rectangular cross-section. The projections 42 and 60 are oriented so that if a user tries to insert a module, such as 32 into a vacant receptacle in the bay formed in the rectangular back panel 38 when the slide bar 44 is in its locked position, the slide bar 44 will be forced to its unlocked position. This takes place as a result of the angled surfaces on the projections 42 and 60 colliding with and sliding the locking elements 58 and 62 laterally. This automatic unlocking feature prevents breakage of the projections 42 and 60 and/or the locking elements 48 and 62.

Thus both embodiments of our invention each have a locking member that is manually movable in the sense that it has with an outer portion that is ergonmicially configured to be grasped by a user's hand and pivoted or slid to positively lock one or more station modules in place. The locking lever 16 has an enlarged outer portion 16a (FIG. 1) that snaps over a small projection 17 in a cut-out corner 10a of the station module 10 to hold the lever in its locked position illustrated in FIG. 2. The V-shaped gripping member 46 (FIG. 7) of the second embodiment is readily grasped between the user's thumb and index finger. The positive module locking mechanism of our invention guards against partial or incomplete insertion of a station module that could lead to shorts that would make the station or zone inoperable. The user is given visual and tactile feedback indicating that a positive lock has been established in the sense that each module has been fully inserted. In the case of the first embodiment illustrated in FIGS. 1–3 each station module 10 is independently locked and unlocked. In the case of the second embodiment illustrated in FIGS. 4–9, a plurality of modules 30, 32, 34 and 40 are simultaneously locked and unlocked with respect to their respective receptacles.

The back panel 20 (FIGS. 2 and 3) of the first embodiment is typically mounted on a vertical wall of a building structure so that each station module 10 is plugged in an removed in a generally horizontal direction away from the user, and toward the user, respectively. The back panel 38 (FIG. 4) of the second embodiment is also typically installed on a vertical wall of a building structure so that the modules, such as 30 (FIG. 6) are plugged in and removed in a horizontal direction, lateral relative to the user. In other words, the back panel 38 is oriented so that the modules are in a vertical column with the station module 34 on top and the power module 40 on the bottom. In both the first and second embodiments the weight of the modules cannot tend to unplug the same.

Figure 10:
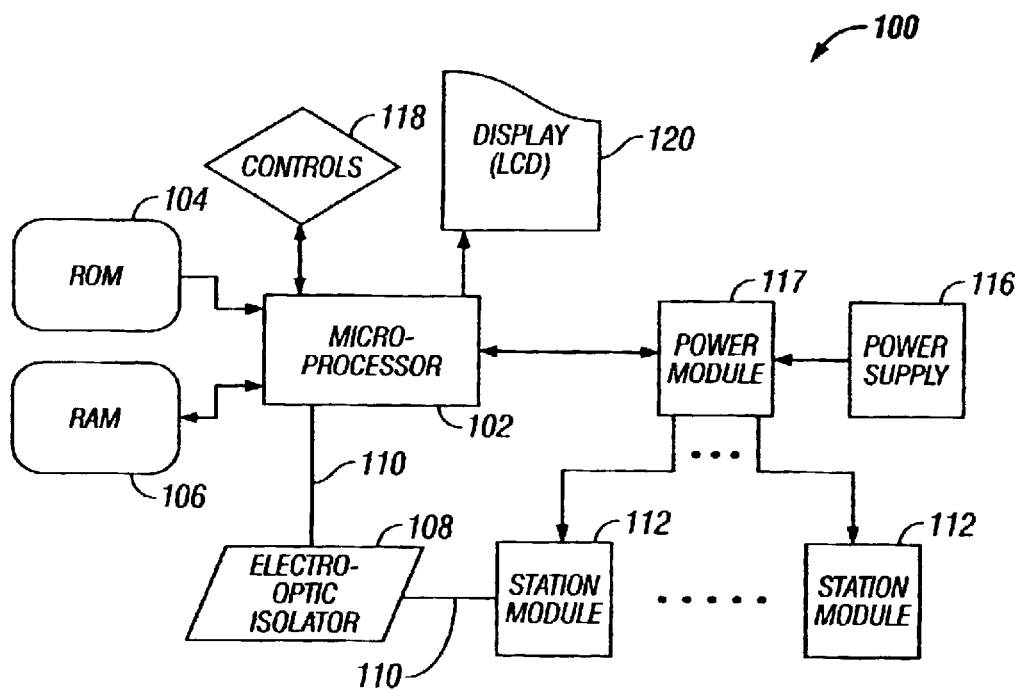
FIG. 10 is a block diagram of the overall irrigation controller circuit that may be used in either of the first or second embodiments.

FIG. 10 is a simplified block diagram of the electronic circuit 100 that may be used with either of the preferred embodiments just described. Briefly, a microprocessor 102 executes a selected watering program stored in ROM 104 using RAM 106. The microprocessor 102 is coupled through an optional electro-optic isolator 108 and a serial bus 110 to one or more removable station modules 112 each including a station module circuit 114 for energizing and de-energizing the solenoid of a valve (not illustrated) connected thereto via insulated wires (not illustrated). The electro-optic isolator 108 protects the microprocessor 102 from damage if lightening should destroy one or more of the station modules 112, but it may be eliminated for cost savings.

The stripped inner ends of the wires that lead to the solenoid valves are securred to conventioinal screw terminals 115a (FIG. 1) on each of the modules 10 of the first embodiment or 115b (FIG. 6) of the second embodiment. The screw terminals 115a are separated by upstanding divider walls 11 (FIG. 1) to prevent contact between adjacent wires. Similarly, the screw terminals 115b are separated by upstanding divider walls 41 (FIG. 6) to prevent contact between adjacent wires.

The valves may be of the type disclosed in U.S. Pat. No. 5,996,608 granted Dec. 7, 1999 of Richard E. Hunter et al. entitled DIAPHRAGM VALVE WITH FILTER SCREEN AND MOVABLE WIPER ELEMENT, Inc.; U.S. Pat. No. 6,079,437 granted Jun. 27, 2000 to Mathew G. Beutler et al. entitled DIAPHRAGM VALVE WITH FLOW CONTROL STEM AIR BLEED, and U.S. Pat. No. 5,979,482 granted Nov. 9, 1999 of Loren W. Scott entitled REMOVABLE CAPTIVE PLUNGER WITH CONTAMINATION PROTECTION, all assigned to Hunter Industries, Inc., the entire disclosures of which are hereby incorporated by reference.

The term "solenoid actuated valve" shall also encompass valves used in irrigation systems in which a pilot valve is not directly opened and closed by a solenoid. These include hydraulically or pneumatically actuated valves which have a solenoid or its electrical equivalent somewhere in the fluid system, and not necessarily next to the gating valve, for controlling the fluid pressure to open and close the valves.

A power supply 116 (FIG. 10) supplies the power needed to run the microprocessor 102 and energize the solenoids of the valves. A removable power module 117 contains current sensing resistors and has pump output terminals. Power is routed from the power supply 116 through the power module 117 to the microprocessor 102 and to the station modules 112. The DC power to run the microprocessor 102 and the logic circuitry inside the station modules 112 is supplied by the power supply 116 through the power module 117 to the microprocessor 102 and then back through the power module 117 to the station modules 112. The AC power for switching the solenoid actuated valves ON and OFF is supplied from the power supply 116 through the power module 117 to the station modules 112. A set of manually actuated controls 118 are connected to the microprocessor 102 for allowing a watering program to be entered, selected, altered, etc. with the aid of graphic and/or alphanumeric symbols shown on LCD 120. The controls may include a rotary switch, one or more pushbuttons, one or more slide switches, one or more membrane switches, one or more toggle switches, one or more insertable pins, a DIP switch, etc. Instead of using separate microprocessor 102, ROM 104 and RAM 106, a single micro-computer with on-chip memory may be utilized. The preferred configuration of our irrigation controller includes a main PC board (not illustrated) which supports the microprocessor 102, ROM 104, RAM 106, electro-optic isolator 108, serial bus 110 manual controls 118 and LCD 120. This main PC board is mounted inside a housing (not illustrated) which is connected via ribbon cable to a back panel such as 20 (FIG. 2) or 38 (FIG. 4) that is hinged to the housing. The back panel 20 or 38 provides the receptacles for removably receiving the station modules 10 or 30, 32, 34.

A port (not illustrated) may be connected to the microprocessor 102 for downloading a watering program that has been created on a personal computer and downloaded into a smart card, portable data shuttle or other removable media. See for example U.S. Pat. No. 6,088,621 granted Jul. 11, 2000 of Peter J. Woytowitz et al. entitled PORTABLE APPARATUS FOR RAPID REPROGRAMMING OF IRRIGATION CONTROLLERS, also assigned to Hunter Industries, Inc., the entire disclosure of which is hereby incorporated by reference. Alternatively, the microprocessor 102 could receive programming and/or commands from a master computer via hard-wired or wireless connection. The programming executed by the microprocessor 102 can include a cleaning cycle which momentarily turns on each valve after completion of a run cycle to flush debris away from the valve seat. See U.S. Pat. No. 5,829,678 granted Nov. 3, 1998 of Richard E. Hunter et al. entitled SELF-CLEANING IRRIGATION REGULATOR VALVE APPARATUS, also assigned to Hunter Industries, Inc., the entire disclosure of which is hereby incorporated by reference.

Figure 11:
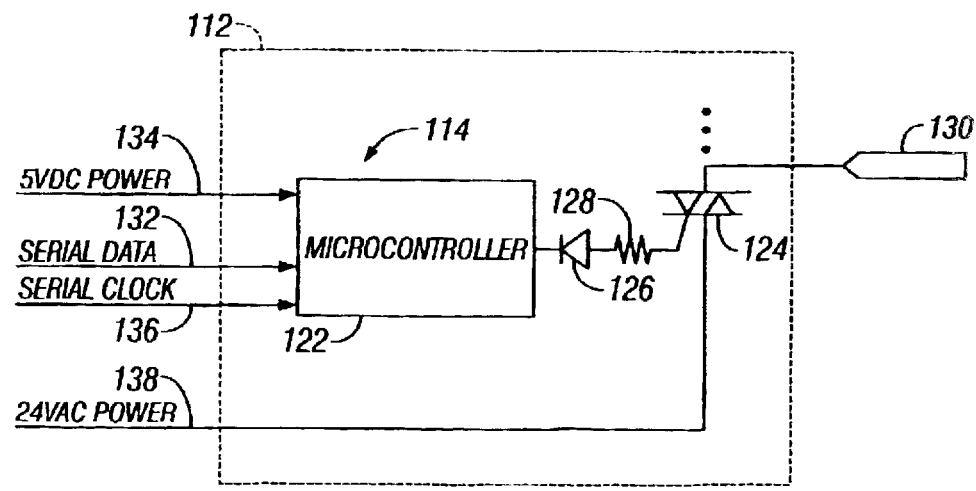
FIG. 11 is a schematic diagram of an exemplary circuit for one of the station modules of the irrigation controller circuit of FIG. 10.

The microprocessor 102 controls a plurality of solenoid actuated valves via the corresponding station module circuit 114 (FIG. 11) which is mounted on a small PC board contained within the plastic housing of each station module 112. The station module circuit 114 includes a microcontroller 122 that drives a switching device in the form of a triac 124 through a diode 126 and resistor 128. The triac 124 comprises two silicon controlled rectifiers (SCRs) connected in parallel and oppositely oriented to allow bi-directional control of a standard twenty-four volt AC signal sent to the solenoid of a valve via terminal 130. The control signal from the serial bus is applied to the microcontroller 122 via serial data lead 132 while a nominal DC voltage signal, such as five volts, is applied via another lead 134. Synchronous serial data is clocked into the microcontroller 122 from the microprocessor 102 via clock lead 136. Twenty-four volt AC power is supplied from the power module 116 to the triac 124 via lead 138. In the preferred embodiment of the station module circuit 114 triac 124, diode 126 and resistor 128 are duplicated eight times so that one station module 112 can independently control up to eight solenoid actuated valves (stations). The valves that supply water to the sprinklers can thus be independently opened and closed by the microprocessor 102 utilizing the station module circuits 114 in accordance with the selected and/or pre-programmed run and cycle times for each of the stations. See also U.S. Pat. No. 5,444,611 granted Aug. 22, 1995 of Peter J. Woytowitz et al. entitled LAWN AND GARDEN IRRIGATION CONTROLLER, also assigned to Hunter Industries, Inc., the entire disclosure of which is hereby incorporated by reference.

Figure 12:
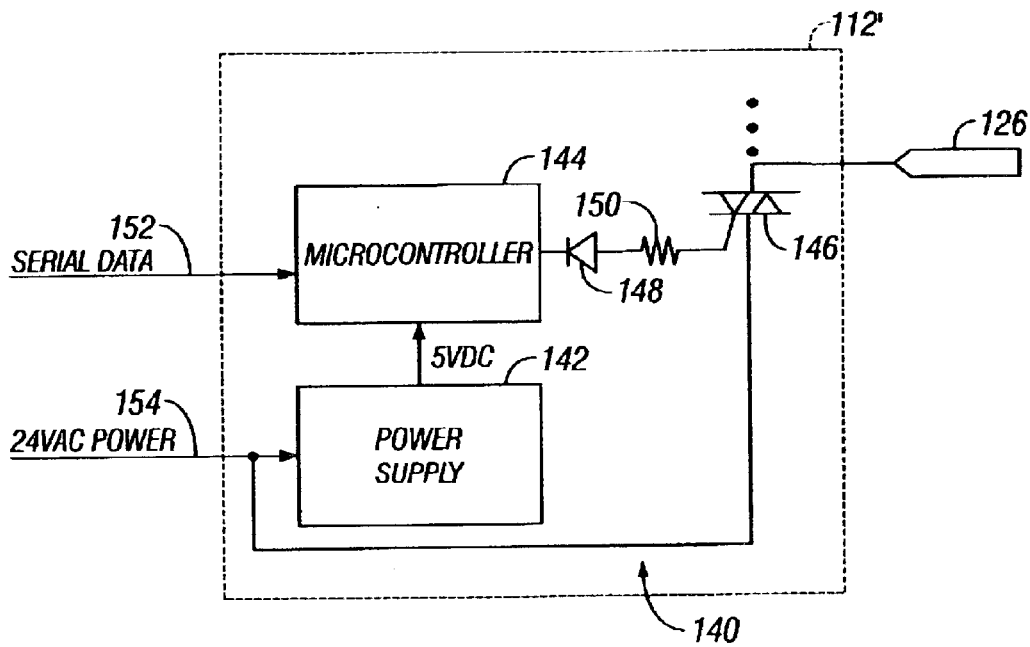
FIG. 12 is a schematic diagram of an alternate circuit for one of the station modules.

FIG. 12 is a schematic diagram of an alternate circuit 140 for one of the station modules 112'. Each station module 112' has its own power supply 142 that supplies a five volt DC signal to a microcontroller 144 that can switch a triac 146 through diode 148 and resistor 150. The station modules 112' each have three sets of the triac 146, diode 148 and resistor 150 (not illustrated) for independently actuating three stations. The alternate station module circuit 140 (FIG. 12) receives asynchronous serial data on serial data line 152. In other words, the microcontroller 144 of the station module 112' derives its clock signal from the serial data signal. Twenty-four volt AC power is supplied to each power supply 142 inside each station module 112' via lead 154.

Those skilled in the art will recognize that besides providing a new irrigation controller, we have also provided a novel method of expanding a modular irrigation controller. Our method includes the step of providing a microprocessor based irrigation controller with a plurality of receptacles for each receiving a station module that is controlled by the microprocessor to open and close a solenoid actuated valve connected to the station module. Our method further includes the step of inserting a module into one of the receptacles. Our method involves the final step of manually moving a locking member mounted adjacent the receptacle from an UNLOCKED position to a LOCKED position to secure the station module in the adjacent receptacle.

While we have described two different preferred embodiments of our modular expandable irrigation controller with improved station module locking means, and a method of expanding a modular irrigation controller, it will be apparent to those skilled in the art that our invention can be modified in both arrangement and detail. For example, each station module 112 or 112' could be configured for controlling only a single station. Therefore, the protection afforded our invention should only be limited in accordance with the following claims.

We claim:

1. A modular expandable irrigation controller, comprising:

control means for manual entry or selection of a watering program;

means for storing the watering program;

processor means for executing the stored watering program and controlling one or more station modules each including a station module circuit for energizing at least one solenoid actuated valve in accordance with the watering program;

means for providing a plurality of receptacles for each removably receiving a station module and for providing an operative connection to the processor means; and means, including a pivotable locking lever on each station module rotatable about an axis substantially normal to an upperside of each station module, for securing each station module in a corresponding receptacle.

2. The controller of claim 1 wherein the station module circuit includes at least one switching device.

3. The controller of claim 1 wherein the means for providing a plurality of receptacles includes a card edge connector in each of the receptacles.

4. The controller of claim 1 wherein the locking lever is connected to a shaft that moves a locking tab underneath a portion of a back panel in which the receptacles are located.

5. The controller of claim 1 and farther comprising means for providing a receptacle for removably receiving a power module and for providing an electrical connection to the processor means.

6. A modular expandable irrigation controller, comprising:

means for entry or selection of a watering program;

a memory that stores the watering program;

a processor that executes the stored watering program and controls one or more station modules each including a station module circuit for opening and closing at least one valve in accordance with the watering program;

a plurality of receptacles each configured to removably receive a station module and provide a connection to the processor; and a locking slide bar mounted adjacent the receptacles and manually moveable from an UNLOCKED position to a LOCKED position to simultaneously unsecure and secure a plurality of station modules in the receptacles.

7. The controller of claim 6 and further comprising a pointer on the locking slide bar that moves between positions adjacent UNLOCKED and LOCKED indicia formed adjacent at least one of the receptacles.

8. The controller of claim 6 wherein each of the receptacles includes a card edge connector.

9. The controller of claim 6 wherein the locking slide bar has a plurality of locking elements that move into and out of obstructing relationship with at least one projection on each of the station modules to simultaneously prevent and permit the removal of the plurality of station modules from their corresponding receptacles, respectively.

10. The controller of claim 9 wherein the locking elements and the projection are configured so that they will collide and move the locking slide bar to its UNLOCKED position if a user plugs the station module into an empty receptacle when the slide bar is in its LOCKED position.

11. A modular expandable irrigation controller, comprising:

a plurality of controls that allow manual entry or selection of a watering program;

a memory that stores the watering program;

a plurality of station modules each capable of energizing at least one valve;

a processor connected to the plurality of controls that executes the stored watering program and controls the station modules in accordance with the watering program;

a plurality of receptacles each configured to removably receive a station module and provide an operative connection to the processor; and a plurality of locking levers, each of the locking levers being pivotably mounted to a corresponding station module with a pivot axis that extends through an upper side of the station module, and each of the locking levers swinging between UNLOCKED and LOCKED positions to respectively release and secure the corresponding station module in a corresponding receptacle.

12. The controller of claim 11 wherein each of the receptacles includes a male cord edge connector.

13. The controller of claim 11 wherein each locking lever is connected to a shaft that moves a locking tab into and out of a securing relationship with an adjacent panel.

14. The controller of claim 11 wherein each receptacle includes an electrical connector.

15. The controller of claim 11 wherein each station module is dropped into a corresponding receptacle.

16. The controller of claim 11 and further comprising LOCKED and UNLOCKED indica adjacent the receptalces.

17. The controller of claim 11 wherein each of the locking levers is ergonomically configured.

* * * * *